US011509732B2

(12) United States Patent
Panikkar et al.

(10) Patent No.: US 11,509,732 B2
(45) Date of Patent: Nov. 22, 2022

(54) SMART SERVICE ORCHESTRATOR

(71) Applicant: Dell Products L.P., Round Rock, TX (US)

(72) Inventors: Shibi Panikkar, Bangalore (IN); Sisir Samanta, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/150,108

(22) Filed: Jan. 15, 2021

(65) Prior Publication Data

US 2022/0232085 A1 Jul. 21, 2022

(51) Int. Cl.
| | | |
|---|---|---|
| G06F 15/173 | (2006.01) | |
| H04L 67/51 | (2022.01) | |
| H04L 67/1008 | (2022.01) | |
| G06N 20/00 | (2019.01) | |
| G06K 9/62 | (2022.01) | |
| H04L 67/5682 | (2022.01) | |

(52) U.S. Cl.
CPC ............ *H04L 67/51* (2022.05); *G06K 9/6256* (2013.01); *G06N 20/00* (2019.01); *H04L 67/1008* (2013.01); *H04L 67/5682* (2022.05)

(58) Field of Classification Search
CPC . H04L 67/16; H04L 67/2852; H04L 67/1008; G06N 20/00; G06K 9/6256
USPC .......... 709/223, 207; 715/771, 810; 382/131
See application file for complete search history.

(56) References Cited

U.S. PATENT DOCUMENTS

| | | | | |
|---|---|---|---|---|
| 8,688,610 | B1* | 4/2014 | Weisberg ............... | G16H 20/10 |
| | | | | 706/46 |
| 2003/0191849 | A1* | 10/2003 | Leong ................... | G06F 16/168 |
| | | | | 709/229 |
| 2007/0006195 | A1* | 1/2007 | Braun .................... | G06F 9/383 |
| | | | | 717/151 |
| 2008/0195718 | A1* | 8/2008 | Hu ......................... | H04L 51/14 |
| | | | | 709/207 |
| 2011/0258568 | A1* | 10/2011 | Pandurangan ......... | G06F 9/451 |
| | | | | 715/771 |
| 2014/0241174 | A1* | 8/2014 | Harris ............... | H04W 72/1257 |
| | | | | 370/252 |
| 2014/0324758 | A1* | 10/2014 | Diaz ..................... | G06N 5/048 |
| | | | | 706/52 |
| 2015/0341240 | A1* | 11/2015 | Iyoob ..................... | G06Q 40/00 |
| | | | | 709/201 |
| 2017/0126792 | A1* | 5/2017 | Halpern ................. | G06N 20/00 |
| 2017/0185902 | A1* | 6/2017 | Kumar ................... | G06Q 10/04 |
| 2017/0264680 | A1* | 9/2017 | Palermo ................ | G06F 30/331 |

(Continued)

*Primary Examiner* — Thuong Nguyen
(74) *Attorney, Agent, or Firm* — Daly, Crowley Mofford & Durkee, LLP

(57) ABSTRACT

A method for executing a service sequence, comprising: selecting, by a service orchestrator, a service that is part of the service sequence; detecting, by the service orchestrator, whether a load metric exceeds a threshold; when the load metric does not exceed the threshold, executing the service to obtain a real response, and continuing execution of the service sequence based on the real response; when the load metric exceeds the threshold, identifying, by the service orchestrator, a deviation behavior identifier that is associated with the service, obtaining an estimated response for the service based on the deviation behavior identifier, and continuing execution of the service sequence based on the estimated response.

17 Claims, 8 Drawing Sheets

(56) References Cited

U.S. PATENT DOCUMENTS

| | | | | |
|---|---|---|---|---|
| 2018/0287902 A1* | 10/2018 | Chitalia | ................ | H04L 43/045 |
| 2018/0309689 A1* | 10/2018 | Nainar | ................. | H04L 45/306 |
| 2019/0087733 A1* | 3/2019 | Dooley | .................... | G06N 5/04 |
| 2019/0243617 A1* | 8/2019 | Stevens | ..................... | G06F 8/42 |
| 2020/0374243 A1* | 11/2020 | Jina | ........................ | H04L 51/02 |
| 2021/0004255 A1* | 1/2021 | Ito | ......................... | G06F 9/5038 |
| 2021/0135943 A1* | 5/2021 | Andrews | ................. | H04L 67/38 |
| 2021/0135983 A1* | 5/2021 | Farnham | ................. | H04L 67/16 |
| 2021/0218639 A1* | 7/2021 | Chen | .................... | H04L 41/147 |
| 2022/0027538 A1* | 1/2022 | Walters | ................. | G06F 30/28 |

* cited by examiner

232

| MICROSERVICE_ID | DEVIATION BEHAVIOR ID | |
|---|---|---|
| MICROSERVICE 1 (E.G. STORE ORDER DETAILS) | EXECUTION MANDATORY | ⟵ 241 |
| MICROSERVICE 2 (E.G. CREDIT CHECK) | EXECUTION CAN BE DELAYED | ⟵ 242 |
| MICROSERVICE 3 (E.G. BACKGROUND VERIFICATION) | RESPONSE CAN BE ESTIMATED BY EVALUATING A STATIC RULE | ⟵ 243 |
| MICROSERVICE 4 (E.G. CREDIT CHECK) | RESPONSE CAN BE ESTIMATED BY USING A MACHINE LEARNING MODEL | ⟵ 244 |
| MICROSERVICE 5 (E.G. ROUTE ORDER TO FACTORY) | RESPONSE CAN BE ESTIMATED BY USING A HYBRID APPROACH | ⟵ 245 |

| MICROSERVICE_ID | MODEL | STATIC RULE | |
|---|---|---|---|
| MICROSERVICE 3 (E.G. BACKGROUND VERIFICATION) | N/A | STATIC_RULE_1_ID | ⟵ 251A |
| MICROSERVICE 4 (E.G. BILL OF MATERIALS) | MODEL_1_ID | N/A | ⟵ 251B |
| MICROSERVICE 5 (E.G. ROUTE ORDER TO FACTORY) | MODEL_2_ID | STATIC_RULE_2_ID | ⟵ 251C |

FIG. 2C

| MICROSERVICE_ID | INPUT | STATIC RULE |
|---|---|---|
| MICROSERVICE 4 (E.G. CREDIT CHECK) | INPUT_1 | EST_RESPONSE_1 — 261A |
| MICROSERVICE 4 (E.G. CREDIT CHECK) | INPUT_2 | EST_RESPONSE_2 — 261B |
| MICROSERVICE 4 (E.G. CREDIT CHECK) | INPUT_3 | EST_RESPONSE_3 — 261C |

SMART SERVICE ORCHESTRATOR

BACKGROUND

Microservices are an approach to distributed systems that promote the use of finely grained services. They can be deployed independently of each other and permit modularization of larger software systems into smaller parts. Microservices can be implemented as separate processes that communicate with each other over a communications network to complete specific work. A microservice may act as "Orchestrator" and call other microservices in a predefined sequence.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided for executing a service sequence, comprising: selecting, by a service orchestrator, a service that is part of the service sequence; detecting, by the service orchestrator, whether a load metric exceeds a threshold; when the load metric does not exceed the threshold, executing the service to obtain a real response, and continuing execution of the service sequence based on the real response; when the load metric exceeds the threshold, identifying, by the service orchestrator, a deviation behavior identifier that is associated with the service, obtaining an estimated response for the service based on the deviation behavior identifier, and continuing execution of the service sequence based on the estimated response.

According to aspects of the disclosure, a system, comprising: a memory; and at least one processor that is operatively coupled to the memory, the at least one processor being configured to perform the operations of: selecting, by a service orchestrator, a service that is part of a service sequence; detecting, by the service orchestrator, whether a load metric exceeds a threshold; when the load metric does not exceed the threshold, executing the service to obtain a real response, and continuing execution of the service sequence based on the real response; when the load metric exceeds the threshold, identifying, by the service orchestrator, a deviation behavior identifier that is associated with the service, obtaining an estimated response for the service based on the deviation behavior identifier, and continuing execution of the service sequence based on the estimated response.

According to aspects of the disclosure, a non-transitory computer-readable medium storing one or more processor-executable instructions, which when executed by at least one processor cause the at least one processor to perform the operations of: selecting, by a service orchestrator, a service that is part of a service sequence; detecting, by the service orchestrator, whether a load metric exceeds a threshold; when the load metric does not exceed the threshold, executing the service to obtain a real response, and continuing execution of the service sequence based on the real response; when the load metric exceeds the threshold, identifying, by the service orchestrator, a deviation behavior identifier that is associated with the service, obtaining an estimated response for the service based on the deviation behavior identifier, and continuing execution of the service sequence based on the estimated response.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2B is a diagram of an example of a database, according to aspects of the disclosure;

FIG. 2C is a diagram of an example of a database, according to aspects of the disclosure;

FIG. 2D is a diagram of an example of a database, according to aspects of the disclosure;

DETAILED DESCRIPTION

Figure 1A:
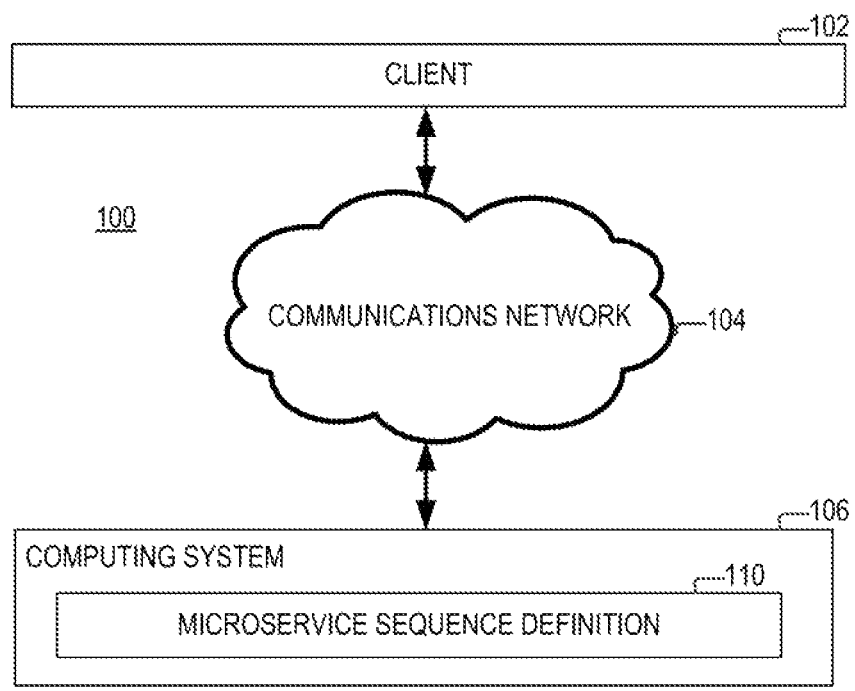
FIG. 1A is a diagram of an example of a system, according to aspects of the disclosure.

FIG. 1A is a diagram of an example of a system 100, according to aspects of the disclosure. As illustrated, the system 100 may include a client device 102 that is coupled to a computing system 106 via a communications network 104. The client device 102 may include a desktop computer, a laptop computer, a smartphone, and/or any other suitable type of computing device. The communications network 104 may include any suitable type of communications network, such as a local area network (LAN), a wide area network (WAN), an 802.11 network, a Long Term Evolution (LTE) network, and/or any other suitable type of communications network. The computing system 106 may include any suitable type of distributed or integrated computing system. The computing system 106 may be configured to execute a microservice sequence 110 for taking purchase orders from the client device 102. According to the present disclosure, the computing system 106 may achieve improved performance by executing the microservices out of order. The manner in which the computing system 106 deviates from the order of the services in the microservice sequence 110 is discussed further below with respect to FIGS. 2A-5. The computing system 106 may be an integrated computing system or a distributed computing system.

Figure 1B:
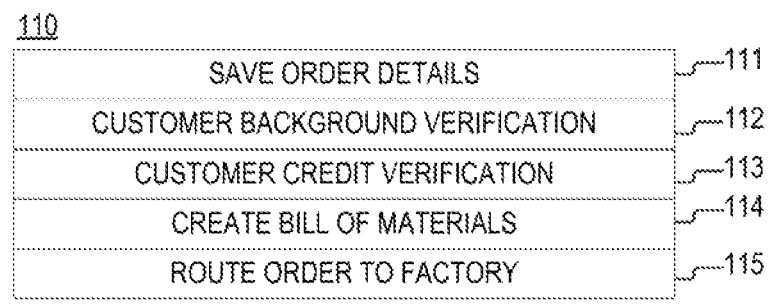
FIG. 1B is a diagram of an example of a service sequence, according to aspects of the disclosure.

FIG. 1B shows the microservice sequence 110 in further detail, according to aspects of the disclosure. As illustrated, the microservice sequence 110 may include microservices 111-115. Microservice 111 may include a microservice for saving order details that are submitted by a customer.

Microservice 112 may include a microservice that is configured to perform background verification of the customer. Microservice 113 may include a microservice that is configured to perform credit verification. Microservice 114 may include a microservice that is configured to create a bill of materials. Microservice 115 may include a microservice that is configured to route the order (and/or a bill of materials) to a selected factory. In some implementations, each of the microservices 115 may be implemented as a separate process. In implementations in which the computing system 106 is a distributed computing system, at least two of the microservices may be executed on different computing devices that are connected via a communications network.

Although the example of FIGS. 1A-5 is provided in the context of a microservice sequence for taking purchase orders, it will be understood that the concepts and ideas provided through the disclosure are not limited to any specific application. Furthermore, although the example of FIGS. 1A-5 is provided in the context of microservice sequences, it will be understood that the concepts and ideas provided throughout the disclosure are not limited to microservices, and they can be applied to executing any suitable type of service sequence.

FIG. 2 is a diagram of an example of an architecture 200 of the computing system 106, according to aspects of the disclosure. As illustrated, the architecture 200 may include an orchestrator 210 that is configured to execute the microservice sequence 110 in accordance with a workflow specification 216. The workflow specification 216 may include one or more documents and/or objects that specify the order in which the microservices 111-115 have to be executed. The workflow specification 216 may specify that: service 111 has to be executed first; microservice 112 has to be executed second; microservice 113 has to be executed third; microservice 114 has to be executed fourth; and microservice 115 has to be executed last. In operation, the orchestrator 210 may attempt to execute microservices 111-115 in the order that is specified in the workflow specification 216. Executing any of the microservices 111-115 may include transmitting a request to the microservice, and receiving a response (i.e., a real response) that is generated based on the request. The request may be transmitted over the communications network 104, and the response may be received over the same communications network.

The speed at which any of the microservices 111-115 can be executed depends on at least three factors: (i) load on the computing device that is executing the orchestrator 210, (ii) load on the computing device that is executing the microservice, and (iii) load on the communications network 104. If the computing device executing the orchestrator 210 does not have sufficient CPU time or sufficient memory, the execution of the microservice may take longer to complete than expected. If the computing device executing the microservice does not have sufficient CPU time or sufficient memory, the microservice may take longer than expected to produce a response to a received request. Similarly, if the communications network 104 has a high latency or low throughput, the execution of the microservice may also take longer than expected.

According to the present disclosure, the orchestrator 210 is configured to anticipate whether any given one of the microservices 111-115 can be executed at a desired speed (e.g., within a desired response time and/or within a desired time window) by evaluating at least one of: (i) a load metric of the computing device that is executing the orchestrator 210; (ii) a load metric of the computing device that is executing the given microservice, and (iii) a load metric of a communications network. If the orchestrator 210 determines that the given microservice cannot be executed at the desired speed, the orchestrator 210 may take alternative action. For example, the orchestrator 210 may delay the execution of the given one of the microservices 111-115 and proceed to execute another one of the microservices 111-115 instead. As another example, the orchestrator 210 may forgo the execution of a given microservice, and instead obtain an estimated response for the given microservice. The orchestrator may then use the estimated response in place of a "real" response from the microservice.

The distinction between a "real" response and an "estimated" response is now described in further detail. When a microservice is executed based on one or more input parameters, the microservice may return a "real" response. The "real" response of the microservice may include one or more of a number, a string, and/or an alphanumerical string that is generated by the microservice based on the input parameters. When an "estimated" response is obtained for the microservice a static rule and/or a machine learning model (associated with the microservice) is evaluated based on the same input parameters. The estimated response may have the same format as the real response. Ideally, the estimated response would have the same or similar value as that of the real response, which in turn would allow the estimated response to be used in place of the real response.

In some implementations, an alternative action may be taken with respect to only some of the microservices 111-115. That is, in some implementations, the execution of any of the microservices 111-115 may be made mandatory, meaning that that response of the microservice cannot be estimated (or delayed), and it must be obtained by executing the microservice directly.

The response estimation system 214 may include a system that is configured to generate estimated responses for any of the microservices 113-115. An estimated response for any of the microservices may be generated by: (i) evaluating a static rule that is associated with the microservice, and/or (ii) executing (e.g., evaluating) a machine learning model that is associated with the microservice.

The orchestrator 210 may include a service-attached data store 230. The service-attached data store 230 may include a portion of a file system that is executed on the same computing device (or system) as the orchestrator 210. In one example, the service-attached data store 230 may be instantiated when the orchestrator 210 is instantiated. Similarly, the service-attached data store 230 may be deallocated when the orchestrator 210 is terminated. According to the present example, the service-attached data store 230 is dedicated for use by the orchestrator 210, such that no other orchestrator can use the service-attached data store 230. The provision of the service-attached data store 230 allows the orchestrator 210 to store and retrieve data from the service-attached data store 230 over the course of its operation. This is in contrast to conventional Kubernetes orchestrators, which might lack the ability to cache data in a dedicated storage. In some implementations, when the orchestrator 210 is powered off, the contents of the service-attached data store 230 may be persisted in the primary data store 225. Similarly, when the orchestrator 210 is started, the state of the service-attached data store 230 may be restored by copying the persisted data from the primary data store 225 back into the service-attached data store 230. According to the example of FIG. 2A, the service-attached data store is configured to store a deviation behavior identifier database 232 and an estimated response database 234.

The response estimation system 214 may include an execution engine 221, a model injector 222, a configurator 223, and a primary data store 225. The response estimation system 214 may further include a training data database 236. The training data database 236 may store historical data, such as (i) input data that is received from the client device 102 for the execution of an instance of the microservice sequence (ii) at least one request that has been submitted previously to any of the microservices 111-115, (iii) and a response to the requests. As is discussed further below, the historical data may be used to train a machine learning model for estimating the response of any of the microservices 111-115 or static rules for estimating the responses of any of the microservices 111-115.

FIG. 2B shows an example of the database 232 in further detail. As illustrated, the database 232 may include a plurality of entries 241-245. Each of the entries 241-245 may correspond to a different one of the microservices 111-115, and it may include a deviation behavior identifier for that service. According to the present disclosure, the deviation behavior identifier may include any number, string, or alphanumerical string that specifies: (i) whether a real response from a given microservice is allowed to be substituted with an estimated response (i.e., whether an estimated response can be used at all), and/or (ii) the manner in which an estimated service response for a given service is to be generated. According to the present disclosure, entry 241 includes a deviation behavior identifier that specifies that the execution of microservice 111 is mandatory, meaning that an estimated response of the microservice 111 is not allowed to be used in the execution of the microservice sequence 110. Entry 242 includes a deviation behavior identifier that specifies that the execution of microservice 112 can be delayed (i.e., attempted at a later time). Entry 243 includes a deviation behavior identifier that specifies that the response of microservice 113 can be estimated by evaluating a static rule based on input parameters that are provided by the user (i.e., the user of client device 102). Entry 244 includes a deviation behavior identifier that specifies the response of microservice 114 may be estimated by using a machine learning model. Entry 245 indicates that the response of microservice 115 can be estimated by using a hybrid approach, which evaluates a static rule based on input parameters provided by the user as well as intermediate data that is generated by a machine learning model.

FIG. 2B is provided as an example only. As used throughout the disclosure, the term "database" shall refer to one or more data structures that store information, irrespective of the implementation. Although in the example of FIG. 2B the deviation behavior identifiers are stored in a centralized database, alternative implementations are possible in which the deviation behavior identifiers are stored in a decentralized manner. For example, the deviation behavior identifier of each of the microservices 111-115 may be stored in a descriptor for that microservice that is used by the orchestrator 210 for the purposes of interacting with the microservice. Stated succinctly, the present disclosure is not limited to any specific method for storing the deviation behavior identifiers of the microservices 111-115.

Figure 2A:
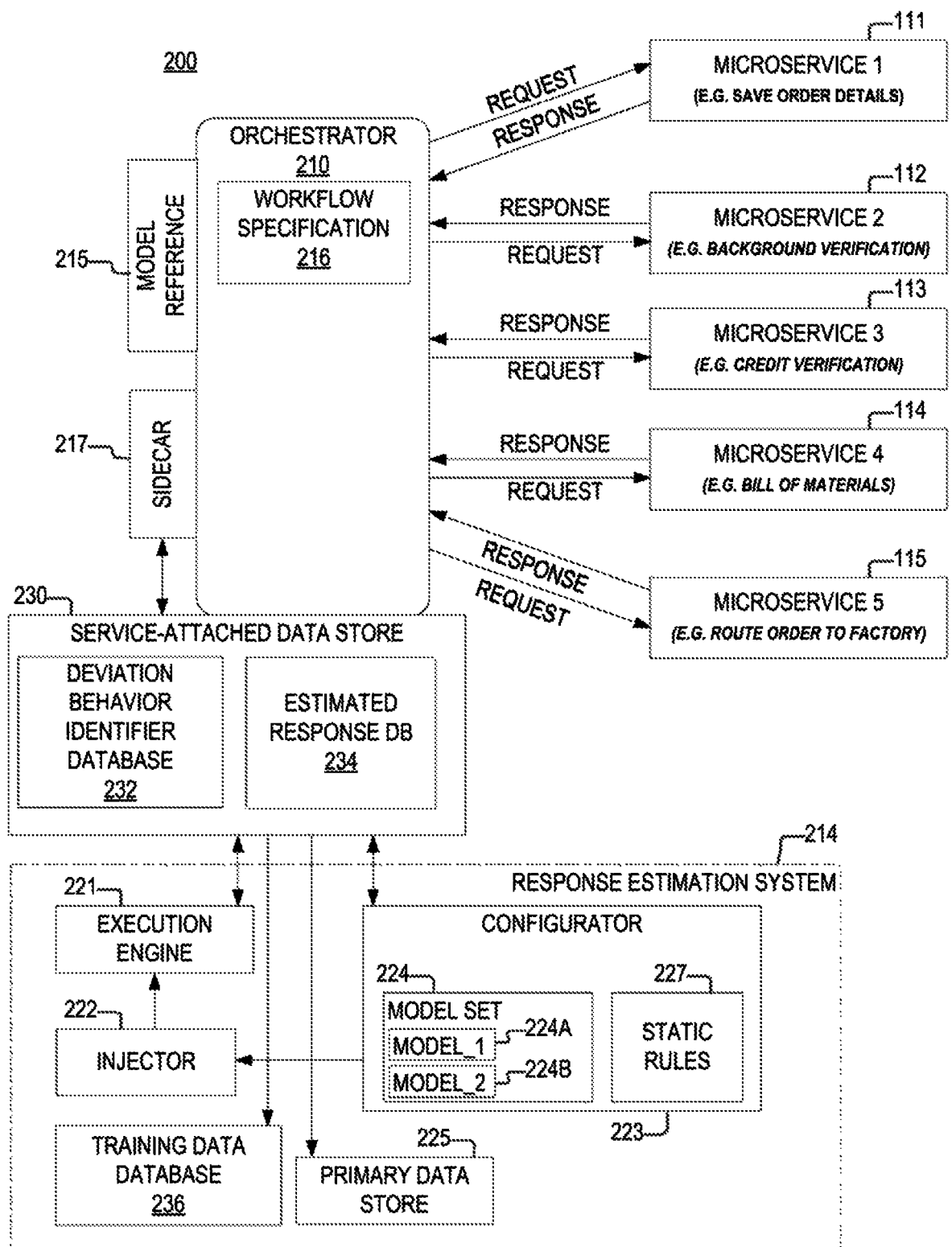
FIG. 2A is a diagram of an example of system for executing a service sequence, according to aspects of the disclosure.

FIG. 2C shows the database 234 in accordance with one implementation. As illustrated, the database 234 may include a plurality of entries 251. Each of the entries 251 corresponds to a different microservice. Each of the entries 251 identifies a static rule and/or a machine learning model for estimating the response of the entry's corresponding microservice. According to the present example, entry 251A contains an identifier corresponding to a first static rule, which can be used to estimate the response of the microservice 113. Entry 251B contains an identifier of a machine learning model 224A (shown in FIG. 2A) that is configured to estimate the response of the microservice 114. Entry 251C contains an identifier of a second static rule that is configured to estimate the response of the microservice 115. Entry 251C further contains an identifier of a machine learning model 224B (shown in FIG. 2A) that is configured to generate one or more input parameters for the second static rule. The second static rule and the machine learning model 224B are used in what is herein referred to as "a hybrid approach" for generating a response. According to the hybrid approach, the machine learning model 224B may be used to generate intermediate data, and the intermediate data is then used to evaluate the second static rule to produce an estimated response for the microservice 115.

FIG. 2D shows the database 234 in accordance with another implementation. As illustrated, the database 234 may include a plurality of entries 261. Each of the entries 261 corresponds to microservice 114. Each of the entries 251 identifies an estimated response of microservice 114 for a corresponding input. Entry 261A identifies a first estimated response, which is expected to be generated by the microservice 114, when the microservice 114 is provided with a first input. Entry 261B identifies a second estimated response, which is expected to be generated by the microservice 114, when the microservice 114 is provided with a second input. Entry 261B identifies a third estimated response, which is expected to be generated by the microservice 114, when the microservice 114 is provided with a third input. Each of the first, second, and third estimated responses may be generated by the execution engine 221 executing a machine learning model (i.e., a machine learning model associated with microservice 114). In some implementations, each of the first, second, and third responses can be generated ahead of time (e.g., before the orchestrator 210 has determined that it needs the response). When the orchestrator 210 needs an estimated response for a particular input, the orchestrator may retrieve the estimated response from the database 234, rather than evaluating the machine learning model in real-time.

Although in the example of FIG. 2D the database 234 includes only three estimated responses for the microservice 114, it will be understood that in some implementations the database 234 may include estimated responses for all feasible (and/or possible) inputs to the microservice 114. The responses may be generated by evaluating a machine learning model for the entire space of feasible (or possible) inputs. The machine learning model may be trained and re-trained periodically as new training data becomes available. The estimated results in the database 234 may be updated periodically, as the machine learning model is re-trained. The term periodically, as used throughout the disclosure, shall mean "at even or uneven time intervals."

FIGS. 2C and 2D are provided as an example only. Although FIG. 2D depicts the database 234 as including estimated responses for one microservice only, it will be understood that the database 234 may include estimated responses for different microservices. Although FIGS. 2C and 2D depict the database 234 as including either entries 251 or entries 261, alternative implementations are possible in which the database 234 includes entries from both types. Although in the example of FIG. 2C-D entries 251/261 are stored in a centralized database, alternative implementations are possible in which the entries. For example, the data illustrated by FIGS. 2C and 2D may be stored in microservice descriptors that are used by the orchestrator 210 for the purposes of interacting with the microservices 111-115. Stated succinctly the present disclosure is not limited to any specific method for storing the information that is discussed with respect to FIGS. 2C-D.

Returning to FIG. 2A, the configurator 223 may be configured to provide a set of machine learning models 224 to the execution engine 221. The set of machine learning models may include the machine learning model 224A and the machine learning model 224B, which are discussed above with respect to FIG. 2C. The configurator 223 may be further configured to provide a set of static rules 227 to the execution engine 221. The set of static rules may include the first and second static rules that are discussed above with respect to FIG. 2C. The configurator 223 may be further arranged to give a unique name to each of the microservices 111-115, provide the workflow specification 216 to the orchestrator 210 (i.e., specify the order of execution of the microservices 111-115), populate the database 232 (i.e., define the behavior of each of the microservices 111-115), populate the database 234 with static rules for evaluating different microservices in the microservice sequence 110, define input and output data schemas of the microservices 111-115, define data that that is to be collected by the orchestrator 210 for the purposes of training the machine learning model, etc.

The execution engine 221 may be configured to generate an estimated service response for any of the microservices 113-115 by evaluating a static rule that is associated with the microservice and/or executing a machine learning model that is associated with the microservice. In addition, the execution engine 221 may perform training of the machine learning models 224A and 224B.

The sidecar 217 may include a container that is configured to provide an interface between the execution engine 221 and the orchestrator 210. For example, when the orchestrator 210 wants to obtain an estimated response, the orchestrator 210 may submit a request to the sidecar 217. The request may include an identifier of a microservice (for which an estimated response is desired) and one or more input parameters. The one or more input parameters may include data that would normally be submitted to the microservice, if the orchestrator 210 were to attempt to execute the microservice directly, instead of obtaining an estimated response. Upon receiving the request, the sidecar 217 may interact with the execution engine 221 to obtain the estimated response. For example, the sidecar 217 may provide the one or more input parameters to the execution engine 221 and cause the execution engine 221 to evaluate a static rule and/or a machine learning model that is associated with the microservice. After the estimated response is obtained from the execution engine 221, the sidecar 217 may provide the response to the orchestrator 210.

In some implementations, the sidecar 217 and the execution engine 221 may communicate via the service-attached data store 230 (e.g., by using a push-and-pull protocol). Any information the sidecar 217 wants to provide to the execution engine 221 may be written to the service-attached data store 230 (by the sidecar 217), from where it can be retrieved by the execution engine 221. Similarly, any information the execution engine 221 wants to provide to the sidecar 217 may be written to the service-attached data store 230 (by the execution engine 221), from where it can be retrieved by the sidecar 217 and used as needed.

In some implementations, the sidecar 217 may be configured identify one or more load metrics and pass the load metrics to the orchestrator 210; as is discussed further below, the load metrics can be used by the orchestrator 210 to determine whether to execute any one of the microservices 113-115 remotely or obtain an estimated response for the microservice. Additionally or alternatively, in some implementations, the sidecar 217 may store training data that is collected by the orchestrator 210 into the training data database 236.

The distinction between a static rule and a model is now discussed in further detail. A static rule may include logic for generating an estimated microservice response. A static rule may include one or more mathematic expressions, and/or one or more symbolic expressions. Evaluating the static rule may include one or more of: (i) evaluating one or more mathematic expressions that are part of the rule, and (ii) evaluating one or more symbolic expressions that are part of the rule, etc. A machine learning model may also include one or more mathematic or symbolic expressions. However, unlike the static rule, the machine learning model is subject to training by a machine learning algorithm, such as Random Forest Classification or Linear Regression, for example.

As noted above, the orchestrator 210 may control the execution of different microservices in a sequence. In that sense, the orchestrator 210 is similar to conventional orchestrators that are used in platforms, such as Kubernetes. However, unlike conventional orchestrators, the orchestrator 210 is also configured to use an estimated microservice response in place of a real microservice response that is generated by executing a microservice. As noted above, the estimated microservice response may be generated by evaluating a static rule and/or executing a machine learning model (rather than executing the microservice). Obtaining an estimated microservice response in place of a real one is advantageous when the real service response cannot be obtained soon enough due to high system load and/or network delay. Furthermore, unlike conventional orchestrators, the orchestrator 210 may also be provided with a network-attached storage (such as the network attached storage 230), which can further can increase the speed at which the orchestrator 210 obtains estimated responses.

Unlike conventional orchestrators, orchestrator 210 may also be configured to collect data for training any of the machine learning models 224A and 224B and store the data in the training data database 236 (e.g., by using the sidecar 230). As noted above, the machine learning model 224A is configured to estimate the response of the microservice 113. The machine learning model 224B, on the other hand, is configured to generate input data that is subsequently used to evaluate a static rule for estimating the response of the microservice 115. To train the machine learning model 224A, the orchestrator 210 may collect one or more first training data samples. Each first training data sample may include: (i) one or more input parameters that are input into the microservice 114, and/or (ii) a response that is generated by the microservice 114 in response to the one or more input parameters. To train the machine learning model 224B the orchestrator 210 may collect one or more second training data samples. Each second training data sample may include at least one of: (i) one or more input parameters that are input into the microservice 115, and (ii) a response that is generated by the microservice 115 in response to the one or more input parameters.

Moreover, unlike conventional orchestrators, the orchestrator 210 may also train machine learning models that are used to generate estimated responses for selected microservices. For example, the orchestrator 210 may be configured to periodically train and re-train the machine learning models 224A and 224B over the course of its operation. In some implementations, the orchestrator 215 may re-train the machine learning models 224A and 224B at time intervals that are specified by a model reference 215. In some implementations, the orchestrator 210 may re-train the models 224A and 224B every day, or every 8 hours. The model reference 215 may include a configuration file that specifies one or more of what types of training data need to be collected by the orchestrator 210, the location in the service-attached data store 230 where the training data needs to be stored, and the time interval(s) at which the training models 224A and 224B need to be stored. As used throughout the disclosure, the phrase "training a machine learning model by an orchestrator" shall refer to one or more of the following" (i) collecting training data, (ii) causing a sidecar (such as the sidecar 217) and/or another entity to collect training data, (iii) providing the training data to a side car and/or an execution engine (such as the execution engine 221), (iv) calculating one or more coefficient or bias values that are part of the machine learning model, and/or (v) causing an execution engine (such as the execution engine 221) or another entity to calculate one or more coefficient or bias values that are part of the machine learning model. In some implementations, the orchestrator 210 may train the machine learning models and/or collect training data in parallel (e.g, concurrently) with the orchestrator 210 executing one or more microservice sequences, such as the microservice sequence 110.

In some implementations, the orchestrator 210 may be configured to orchestrate the execution of services in Kubernetes and/or any other suitable type of service or microservice platform.

Figure 3A:
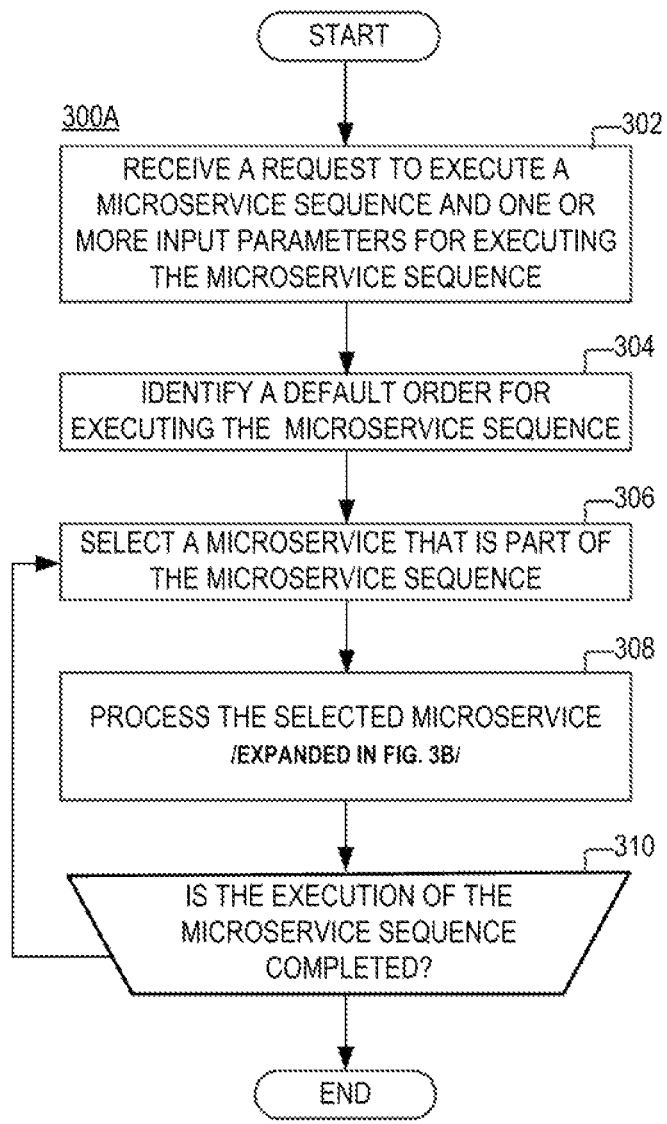
FIG. 3A is a flowchart of an example of a process, according to aspects of the disclosure.

FIG. 3A is a flowchart of an example of a process 300A, according to aspects of the disclosure. At step 302, the orchestrator 210 receives a request to execute the microservice sequence 110 and one or more input parameters. At step 304, the orchestrator 210 retrieves the workflow specification 216 to determine a default order for executing the microservices 111-115. At step 306, the workflow selects one of the microservices 111-115. The microservice may be selected based on the workflow specification and/or other information that sets the order in which the microservices 111-115 are selected by the orchestrator 210. In some implementations, the selected microservice may be one that has not been executed yet during the current run of the microservice sequence 110. At step 308, the orchestrator processes the selected microservice. Processing the selected microservice may include one or more of: (i) delaying the execution of the microservice, (ii) executing the selected microservice to obtain a real response, and (iii) obtaining an estimated response for the selected microservice. Step 308 is discussed in further detail with respect to FIG. 3B. At step 310, the orchestrator 210 determines whether the execution of the microservice sequence 110 is completed. If the execution of the microservice sequence 110 is completed, the process 300A ends. Otherwise, the process 300A returns to step 306 and the execution of the microservice sequence 110 continues. In some instances, the execution of the microservice sequence 110 may continue based on an estimated or real response for the microservice (selected at step 306), which is obtained at step 308. In some implementations, continuing the execution of the microservice sequence 110 based on a response obtained at step 308 may include one or more of: (i) marking the microservice (selected at step 306) as completed, (ii) storing the response (obtained at step 308) at a predetermined memory location, (iii) using the response as a basis for executing logic for selecting the next microservice in the microservice sequence 110, and (iv) using the response as an input to another microservice in the microservice sequence 110.

Figure 3B:
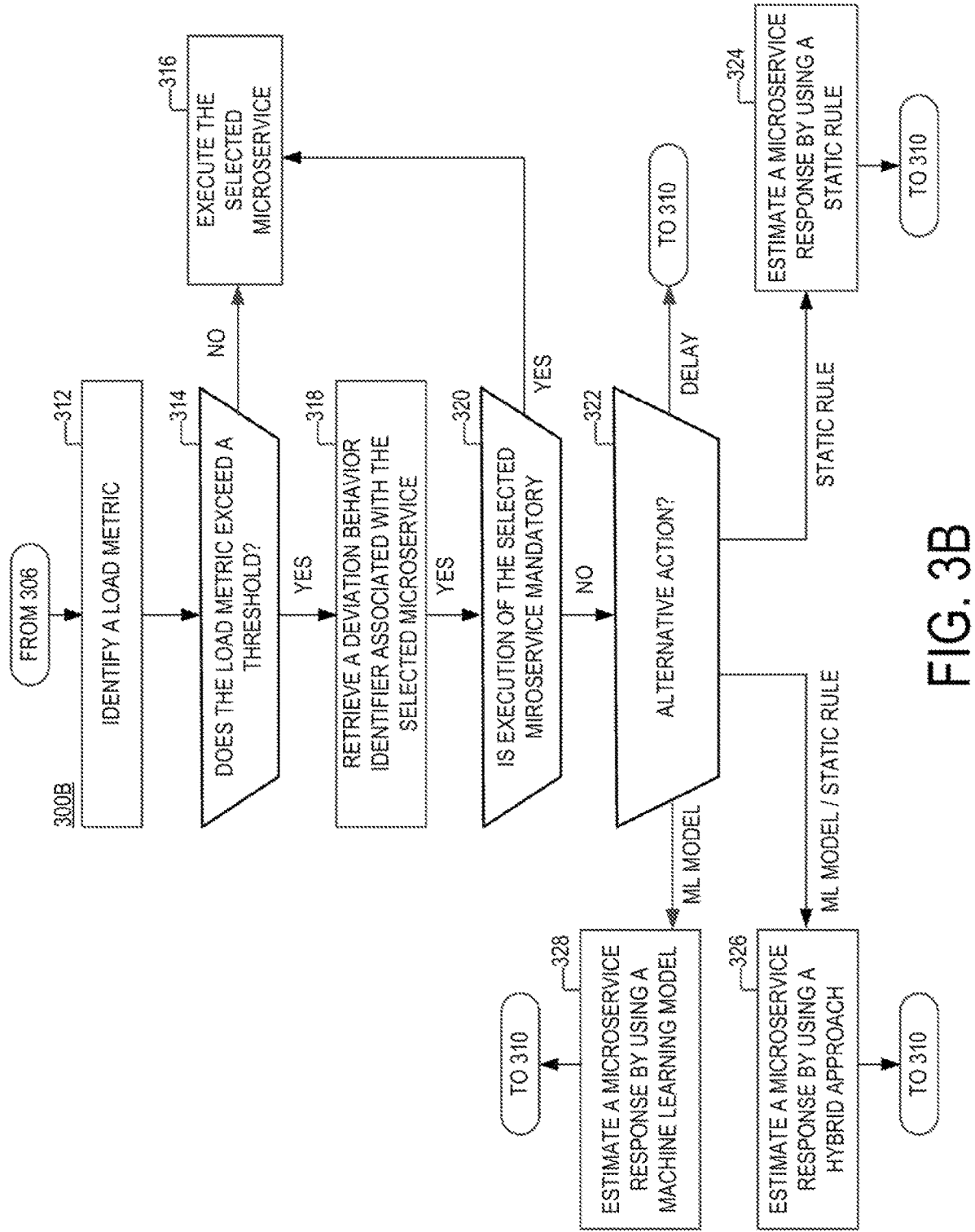
FIG. 3B is a flowchart of an example of a process, according to aspects of the disclosure.

FIG. 3B is a flowchart of an example of a process 300B for obtaining a response for a microservice, as specified at step 308 of the process 300A.

At step 312, the orchestrator 210 identifies a load metric. The load metric may include one or more of: (i) a measure of the load on a first computing device that is executing the orchestrator 210 (e.g., CPU utilization rate, memory utilization rate, etc.), a (ii) a measure of the load on a second computing device that is executing the microservice (selected at step 308) (e.g., CPU utilization rate, memory utilization rate, etc.), (iv) a measure of the load on the communications network 104 (e.g., one or more of latency, available bandwidth, and throughput of a communications link that connects the first computing device and the second computing device). In some implementations, as noted above, the orchestrator 210 may obtain the load metric from the sidecar 217. In some implementations, the first and second computing devices may be different computing devices.

At step 314, the orchestrator 210 determines if the load metric exceeds a threshold. If the load metric exceeds the threshold, the process 300B proceeds to step 316. If the load metric does not exceed the threshold, the process 300B proceeds to step 316.

At step 316, the orchestrator 210 executes the microservice (selected at step 308). Executing the microservice includes transmitting a request to the microservice (e.g., via a communications network or a network socket) and receiving a real response from the microservice that is generated based on the request. The request may include one or more input parameters that are used as a basis for executing the microservice. The input parameters may be provided by the client device 102 and/or generated by executing another one of the microservices in the sequence 110. As discussed above, the request, the one or more input parameters), and the real response may be stored in the service-attached data store 230 and subsequently used for training the model 224.

At step 318, the orchestrator 210 retrieves a deviation behavior identifier for the microservice (selected at step 308). The deviation behavior identifier may be retrieved from the database 232 and/or a descriptor of the microservice, etc. In some implementations, the orchestrator 210 may use the sidecar 217 to retrieve the deviation behavior identifier from the database 232. However, it will be understood that the present disclosure is not limited to any specific method for retrieving the deviation behavior identifier.

At step 320, the orchestrator 210 detects, based on the deviation behavior identifier, whether the execution of the microservice (selected at step 306) is mandatory. If the execution of the microservice is mandatory, the process 300B proceeds to step 316 and the microservice is executed anyway. Otherwise, if the execution of the microservice is not mandatory, the process 300B proceeds to step 322 and an alternative action for obtaining a service response is determined.

At step 322, the orchestrator 210 identifies an alternative action to executing the microservice (selected at step 306). The alternative action may be identified based on the deviation behavior identifier (retrieved at step 318). The alternative action may include one or more of: (i) executing the microservices at a later time rather than executing at the current time instance (i.e., delaying the microservice), (ii) obtaining an estimated response of the microservice by using a machine learning model, (iii) obtaining an estimated response of the microservice by using a static rule, and (iv) obtaining an estimated response by using a hybrid approach. If the orchestrator 210 decides to delay the execution of the microservice, the process 300B returns to step 310 of the process 300A. If the orchestrator 210 decides to use a static rule to estimate the response of the selected microservice, the process 300B proceeds to step 324. If the orchestrator 210 decides to use a hybrid approach to obtain a response of the selected microservice, the process 300B proceeds to step 326. And if the orchestrator 210 decides to use a machine learning model to estimate the response of the selected microservice, the process 300B proceeds to step 328.

At step 324, the orchestrator 210 estimates the response of the microservice by executing a static rule. For example, the orchestrator 210 may transmit, to the sidecar 217, a request for an estimated response. The request may include input data and/or an identifier of the microservice. The sidecar 217 may forward the request (and input data) to the execution engine 221. The execution engine 221 may identify a static rule that is associated with the microservice by using the service-attached database 234 and/or a descriptor of the microservice, etc. The execution engine 221 may produce the estimated response by evaluating the static rule. The execution engine 221 may evaluate the statice rule based on input data that is provided with the response. The execution engine 221 may store the estimated response in the service-attached data store 230. The sidecar 217 may fetch the estimated response from the service-attached data store 230 and provide the estimated response to the orchestrator 210.

At step 326, the orchestrator 210 estimates the response of the microservice by using a hybrid approach. For example, the orchestrator 210 may transmit, to the sidecar 217, a request for an estimated response. The request may include input data and/or an identifier of the microservice. The sidecar 217 may forward the request to the execution engine 221. The execution engine 221 may use the database 234 to identify a static rule and a machine learning model that are associated with the microservice. The execution engine 221 may execute the machine learning model 224 to obtain intermediate data. In some implementations, the machine learning model may be executed based on input data that is provided with the response. The execution engine 221 may then identify a static rule that is associated with the microservice. The execution engine 221 may identify the static rule by using the database 234 and/or a descriptor of the microservice, etc. The execution engine 221 may generate an estimated response for the selected microservice by evaluating the static rule based on the intermediate data. In some implementations, the static rule may also be evaluated based on input data that is provided with the response. The execution engine 221 may store the estimated response in the service-attached data store 230. The sidecar 217 may fetch the estimated response from the local datastore 230 and provide it to the orchestrator 210.

At step 328, the orchestrator 210 estimates the response of the microservice by using a machine learning model. For example, the orchestrator 210 may transmit, to the sidecar 217, a request for an estimated response. The request may include input data and/or an identifier of the microservice. The sidecar 217 may forward the request (and input data) to the execution engine 221. The execution engine 221 may identify a machine learning model that is associated with the microservice by using the database 234 and/or a descriptor of the microservice, etc. The execution engine 221 may generate an estimated response by executing the identified machine learning model. In some implementations, the execution engine 221 may execute the machine learning model based on input data that is associated with the request. The execution engine 221 may store the estimated response in the service-attached data store 230. The sidecar 217 may fetch the estimated response from the service-attached data store 230 and provide it to the orchestrator 210.

According to the Example of FIG. 3B, machine learning models are executed in real-time at steps 326 and 328. However, alternative implementations are possible in which, at each of the steps 328 and 326, an estimated response is retrieved from the database 234, which is generated ahead of time by executing a machine learning model. As noted above, in some implementations, the execution engine 221 may periodically execute the machine learning algorithm (of a particular model) for all probable input in the background. As a result of doing so, the execution engine 221 may generate a set of estimated results for an entire space of probable (and/or possible) inputs. The set of results may then be stored in the estimated response database 234. When the orchestrator wants to obtain an estimated result, the orchestrator may retrieve the result from the estimated response database 234 (and/or the service-attached data store 230), rather than evaluating the particular model in real-time. As can be readily appreciated, retrieving the result from the estimated response database (and/or service-attached data store) is advantageous because it can be performed faster than executing a particular model in real-time.

Figure 4:
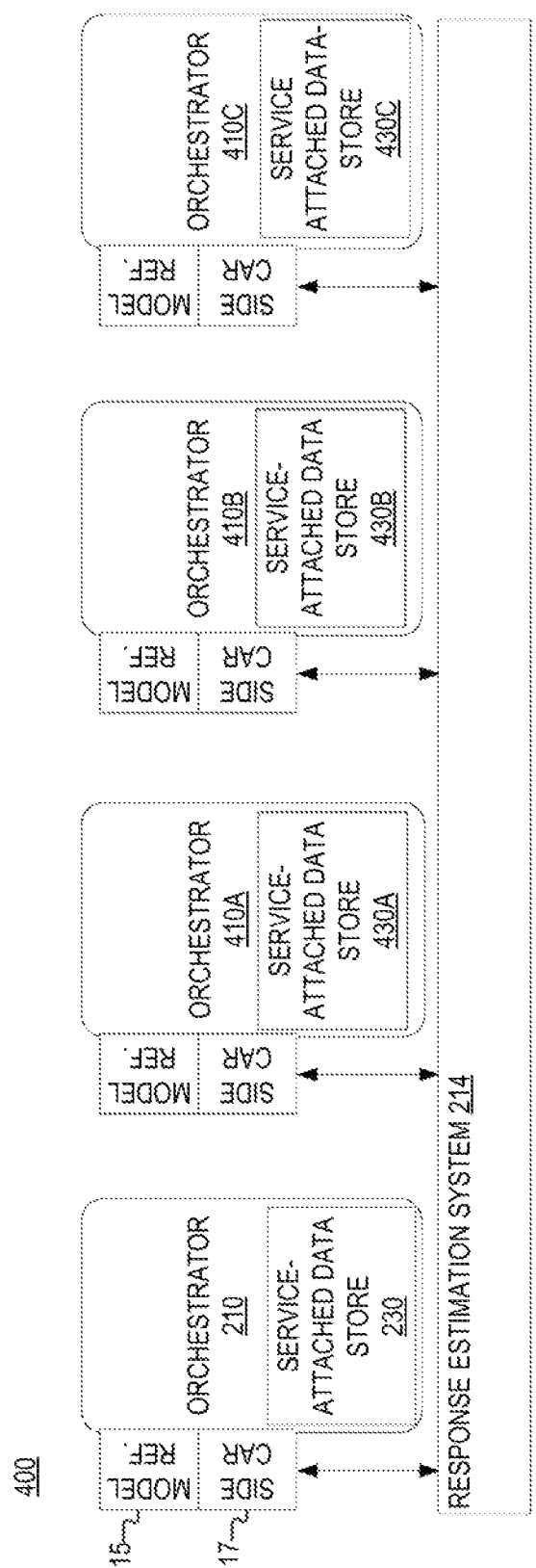
FIG. 4 is a diagram of an example of a system, according to aspects of the disclosure.

FIG. 4 is a diagram of an example of a system 400, according to aspects of the disclosure. The system 400 may include the orchestrator 210, which, as noted above, is provided with the service-attached data store 230, and which is coupled to the response estimation system 214. Furthermore, the system 400 may include an orchestrator 410A that is provided with a service-attached data store 430A, and which is coupled to the response estimation system 214; an orchestrator 410B that is provided with a service-attached data store 430B, and which is coupled to the response estimation system 214 via the service-attached data store 230; and an orchestrator 410C that is provided with a service-attached data store 430C, and which is coupled to the response estimation system 214 via the service-attached data store 230. In some implementations, each of the orchestrators 410A, 410B, and 410C may be configured to execute the processes 300A and 300B, which are discussed above with respect to FIGS. 3A-B, respectively. In some implementations, each of the service-attached data stores 430A, 430B, and 430C may be the same or similar to the service attached data store 230. In this regard, it will be understood that FIG. 4 is provided to illustrate that the approach discussed with respect to FIGS. 1A-3B can be scaled up to an arrangement that includes multiple orchestrators that are provided with different service-attached data stores, and which share the same response estimation system.

Figure 5:
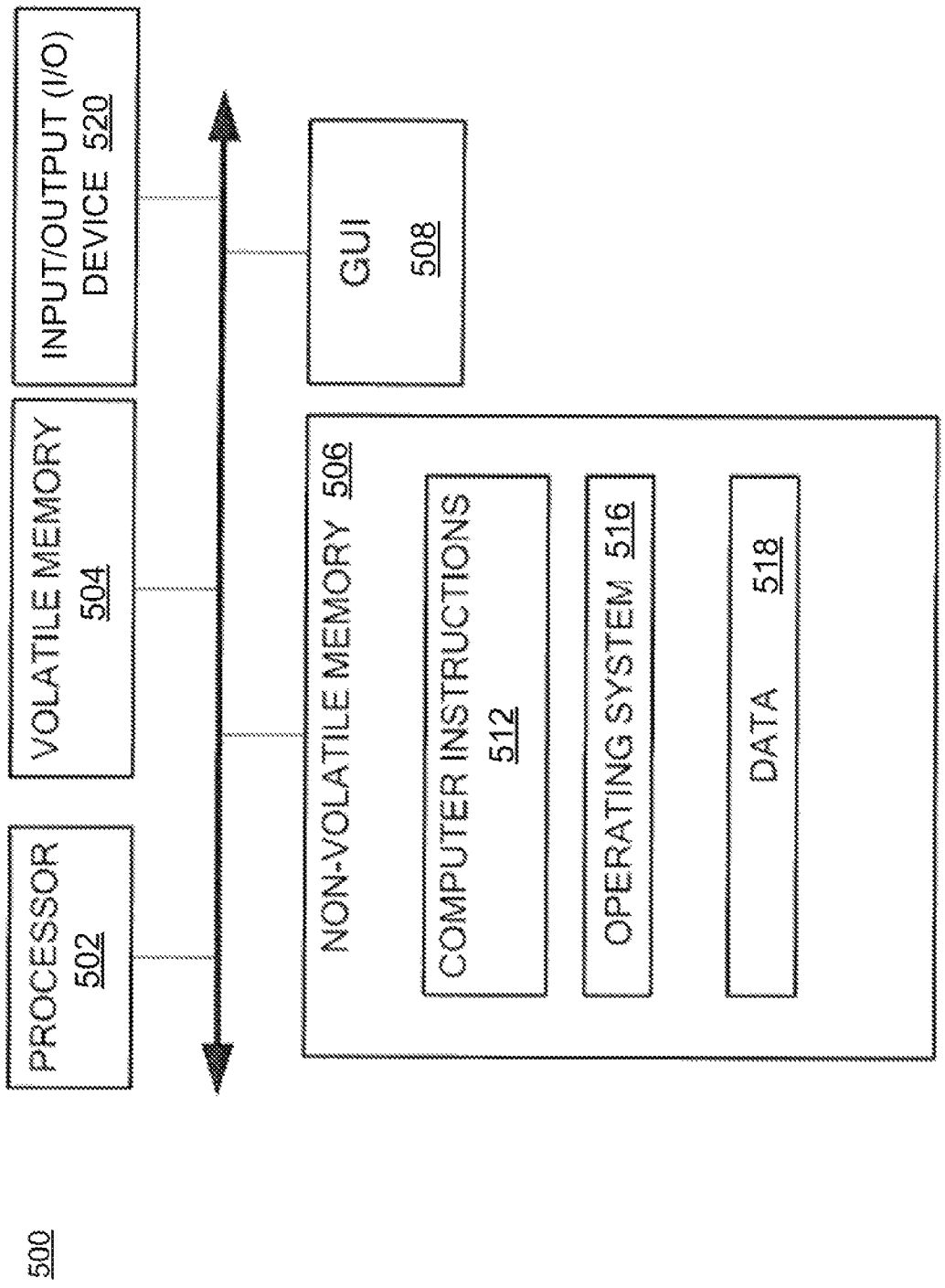
FIG. 5 is a diagram of an example of a computing device, according to aspects of the disclosure.

Referring to FIG. 5, computing device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

Processor 502 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1A-5 are provided as an example only. At least some of the steps discussed with respect to FIGS. 1A-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for executing a service sequence, comprising:
   selecting, by a service orchestrator, a service that is part of the service sequence;
   detecting, by the service orchestrator, whether a load metric meets a threshold;
   when the load metric does not meet the threshold, executing the service to obtain a real response, and continuing an execution of the service sequence based on the real response; and
   when the load metric meets the threshold and a deviation behavior identifier for the service indicates that a real response of the service is permitted to be substituted with an estimated response for the service, obtaining the estimated response for the service and continuing the execution of the service sequence based on the estimated response,
   wherein the estimated response is obtained and the service sequence is executed based on the estimated response only when the deviation behavior identifier for the service indicates that the estimated response for the service is permitted to be used in place of the real response in the execution of the service sequence,
   wherein the deviation behavior identifier is an identifier which, when set to a predetermined value, enables the service orchestrator to use, an estimated response for the service in place of a real response in the execution of the service sequence, the real response including a response that is returned by the service, and the estimated response including a response that is generated by using one or both of a static rule and a machine learning model.

2. The method of claim 1, wherein continuing the execution of the service sequence based on the estimated response includes using the estimated response in place of a real response in the execution of the service sequence.

3. The method of claim 1, further comprising training a machine learning model that is configured to generate the estimated response, wherein the machine learning model is trained by the service orchestrator in parallel with the service orchestrator executing one or more service sequences.

4. The method of claim 1, wherein obtaining the estimated response includes executing a machine learning model to determine intermediate data, and evaluating a static rule based on the intermediate data.

5. The method of claim 1, wherein obtaining the estimated response includes evaluating a static rule.

6. The method of claim 1, wherein obtaining the estimated response includes evaluating a machine learning model.

7. A system, comprising:
   a memory; and
   at least one processor that is operatively coupled to the memory, the at least one processor being configured to perform the operations of:
   selecting, by a service orchestrator, a service that is part of a service sequence;
   detecting, by the service orchestrator, whether a load metric meets a threshold;
   when the load metric does not meet the threshold, executing the service to obtain a real response, and continuing an execution of the service sequence based on the real response; and
   when the load metric meets the threshold and a deviation behavior identifier for the service indicates that a real response of the service is permitted to be substituted with an estimated response for the service, obtaining the estimated response for the service and continuing the execution of the service sequence based on the estimated response,
   wherein the estimated response is obtained and the service sequence is executed based on the estimated response only when the deviation behavior identifier for the service indicates that the estimated response for the service is permitted to be used in place of the real response in the execution of the service sequence,
   wherein the deviation behavior identifier is an identifier which, when set to a predetermined value, enables the service orchestrator to use, an estimated response for the service in place of a real response in the execution of the service sequence, the real response including a response that is returned by the service, and the estimated response including a response that is generated by using one or both of a static rule and a machine learning model.

8. The system of claim 7, wherein continuing the execution of the service sequence based on the estimated response includes using the estimated response in place of a real response in the execution of the service sequence.

9. The system of claim 7, wherein:
   the at least one processor is further configured to perform the operation of training a machine learning model that is configured to generate the estimated response, and
   the machine learning model is trained by the service orchestrator in parallel with the service orchestrator executing one or more service sequences.

10. The system of claim 7, wherein obtaining the estimated response includes executing a machine learning model to determine intermediate data, and evaluating a static rule based on the intermediate data.

11. The system of claim 7, wherein obtaining the estimated response includes evaluating a static rule.

12. The system of claim 7, wherein obtaining the estimated response includes evaluating a machine learning model.

13. A non-transitory computer-readable medium storing one or more processor-executable instructions, which when executed by at least one processor cause the at least one processor to perform the operations of:
   selecting, by a service orchestrator, a service that is part of a service sequence;
   detecting, by the service orchestrator, whether a load metric meets a threshold;
   when the load metric does not meet the threshold, executing the service to obtain a real response, and continuing an execution of the service sequence based on the real response; and
   when the load metric meets the threshold and a deviation behavior identifier for the service indicates that a real response of the service is permitted to be substituted with an estimated response for the service, obtaining the estimated response for the service and continuing the execution of the service sequence based on the estimated response,
   wherein the estimated response is obtained and the service sequence is executed based on the estimated response only when the deviation behavior identifier for the service indicates that the estimated response for the service is permitted to be used in place of the real response in the execution of the service sequence,
   wherein the deviation behavior identifier is an identifier which, when set to a predetermined value, enables the service orchestrator to use, an estimated response for the service in place of a real response in the execution of the service sequence, the real response including a response that is returned by the service, and the estimated response including a response that is generated by using one or both of a static rule and a machine learning model.

14. The non-transitory computer-readable medium of claim 13, wherein continuing the execution of the service sequence based on the estimated response includes using the estimated response in place of a real response in the execution of the service sequence.

15. The non-transitory computer-readable medium of claim 13, wherein:
the one or more processor-executable instructions further cause the at least one processor to perform the operation of training a machine learning model that is configured to generate the estimated response, and
the machine learning model is trained by the service orchestrator in parallel with the service orchestrator executing one or more service sequences.

16. The non-transitory computer-readable medium of claim 13, wherein obtaining the estimated response includes executing a machine learning model to determine intermediate data, and evaluating a static rule based on the intermediate data.

17. The non-transitory computer-readable medium of claim 13, wherein obtaining the estimated response includes evaluating a static rule.

* * * * *